United States Patent [19]

Miyauchi

[11] 4,053,295
[45] Oct. 11, 1977

[54] METHOD OF MAKING A COOKING UTENSIL LID

[76] Inventor: Keinosuke Miyauchi, 12-15 Shirogane 4-Chome, Minato, Tokyo, Japan

[21] Appl. No.: 683,497

[22] Filed: May 5, 1976

[30] Foreign Application Priority Data

Sept. 8, 1975 Japan .............................. 50-108672
Oct. 21, 1975 Japan .............................. 50-143201
Oct. 21, 1975 Japan .............................. 50-143202

[51] Int. Cl.² ........................................... C03B 27/00
[52] U.S. Cl. ....................................... 65/62; 65/104; 29/447; 29/462; 29/508
[58] Field of Search ............................ 65/104, 62, 114; 29/447, 462, 508, 509; 220/74, 82 R, 82.5, 82

[56] References Cited

U.S. PATENT DOCUMENTS

| 2,730,840 | 1/1956 | Craig | 29/462 |
| 3,199,717 | 8/1965 | Povering | 220/82.5 |
| 3,362,558 | 1/1968 | Blood | 65/104 X |
| 3,438,539 | 4/1969 | Le Roy | 220/82 R |

Primary Examiner—Arthur D. Kellogg
Attorney, Agent, or Firm—James E. Nilles

[57] ABSTRACT

A method of making a cooking utensil lid comprises the steps of forming the heated transparent glass plate to a lid body having an engaging rim portion provided around the outer circumference of a see-through portion of the lid body; and cooling the whole of the lid body to form a tempered glass. A cooking utensil lid made of tempered glass plate having a see-through portion and an engaging rim portion provided around the outer circumference of the see-through portion; and a reinforcing ring member fitted integral onto the engaging rim portion. The lower and outer part of the reinforcing ring member is provided with a recess for engaging with the opening rim of a cooking utensil. A water drop guiding member is downwardly projected from the inner side of the reinforcing ring member so as to have a space from the inner wall of the cooking utensil.

1 Claim, 7 Drawing Figures

METHOD OF MAKING A COOKING UTENSIL LID

The present invention relates to a method of making a cooking utensil lid which is used on, for example, a saucepan, an iron pot, a frying pan, a kettle, a steamer or the like and the method of making the same.

Generally speaking, cooking has been done with the lid mounted on a cooking utensil such as a saucepan and it has been necessary to take off the lid from the cooking utensil to check the state of cooking in the cooking utensil. Accordingly, there has been an increase in demand for a cooking utensil lid allowing the state of cooking to be checked with the lid mounted on the cooking utensil.

The present invention is intended to meet the demand and to provide a cooking utensil lid formed by the steps of heating a transparent glass plate to form a desired shape of lid having an engaging rim portion along the outer circumference of the see-through portion of the lid and cooling the whole of the lid to a tempered glass.

There have been well known the lid which is used on the conventional cooking utensil and which has a part or the whole of the lid of glass or transparent synthetic resin so as to allow the state of cooking in the cooking utensil to be checked with the lid mounted on the cooking utensil. It is desirable in this case that this conventional lid is generally made of heat-resisting glass from the viewpoint of its transparency, heat resistance, handling and appearance. However, this conventional cooking untensil lid has had such various problems in its transparency and handling that its transparency is bad; its strength to endure impacts is low; and its weight is greater than that of the light-weight saucepan made of, for example, aluminum to thereby make unstable the saucepan with the lid mounted thereon.

The present invention is intended to solve these problems.

According to the present invention, the whole of the lid is made of tempered glass to enhance its strength and can be easily manufactured with low cost. In addition, the lid made of tempered glass according to the present invention has much more smooth surface than that of the lid made of heat-resisting glass and is extremely so high in its transparency that the inside of the cooking utensil having the lid mounted thereon can be clearly seen through, thus making it unnecessary to sometimes take off the lid from the cooking utensil in the course of cooking to check the state of cooking and making it possible to avoid spoiling the taste of cooking. Further, the best cooking can be always promised under proper condition so that there is no failure of cooking. Still further, the lid according to the present invention has a good appearance to provide a good display effect in a shop. Still further, the lid according to the present invention has extremely much greater strength against impacts than that of the lid made of heat-resisting glass so that there is no anxiety of its being broken even if any impact of some extent is applied thereto, thus allowing safety to be guaranteed. Still further, the lid according to the present invention is light in weight so that the lid mounted on a light-weight cooking utensil such as the one made of, for example, aluminum provides no possibility of rendering unstable the cooking utensil with the lid mounted thereon and that the handling of the lid is extremely good. Still further, the heat resistance of the lid according to the present invention is so high as to resist such a high temperature of about 200° C. Still further, the lid according to the present invention has so smooth surface that water drops adhering to the surface can easily run down, thus preventing the lid from being dimmed by vapor. Accordingly, the lid according to the present invention is the most suitable for use as a lid which is mounted on the cooking utensil and which enables the inside of the cooking utensil to be seen through.

When the whole of a lid is made of a glass plate, the outer circumference of the lid thus formed is comparatively brittle and particularly low in its strength against impacts. Therefore, when this lid is taken off or mounted on the cooking utensil or is stocked, it is liable to be easily damaged or broken off. Accordingly, the handling of this lid must be extremely careful and, when it is once broken off, its broken off portion is dangerous to injure the hands of a handling person. Therefore, when it is once damaged or broken off, it is liable to be left unused, however expensive it may be, thus making it uneconomic.

The present invention is intended to eliminate such drawback.

According to the present invention, integral to the engaging rim portion of the lid is attached a reinforcing ring member to securely protect the upper and the lower faces as well as the end face of the engaging rim portion. The engaging rim portion of the lid is left untouched with the cooking utensil on which the lid is to be mounted, so that when it is taken off or mounted on the cooking utensil or is stocked or is washed out, there is no anxiety of its being damaged or broken off, thus making it safe and easy in handling.

Generally, the lid is used in such a manner that the outer circumference thereof is engaged with the stepped portion provided along and near the opening rim of the cooking utensil. However, such cooking utensil as a frying pan is not provided with the stepped portion but formed to have an opening rim portion extending vertically to the base of the pan. Therefore, the lid is difficultly mounted on or taken off from such frying pan, thus making the cooking in this case inconvenient.

The present invention is also intended to eliminate this inconvenience.

According to the present invention, an engaging recess portion is provided along the lower and outer side of the reinforcing ring member so as to enable the lid to be securely mounted on the opening rim of the cooking utensil and to be easily mounted on or taken off from such cooking utensil as the frying pan which is not provided with the stepped portion along and near the opening rim but formed to have an opening rim portion extending vertically to the base of the pan. Therefore, the present invention provides a cooking utensil lid having a wide range of use.

Further, the lid according to the present invention is provided with a guiding member for guiding water drops, said guiding member being downwardly projected from the inner and lower side of the reinforcing ring member attached to the engaging rim portion of the lid and being arranged to have a predetermined space from the inner wall near the opening rim of the cooking utensil when the lid is mounted on the cooking utensil.

As stated above, the lid is generally used in such a manner that the engaging rim portion of the lid is engaged with the stepped portion provided along and near the opening rim of the cooking utensil. In this case water drops adhering to the inner surface of the lid flow on the surface to the outer circumference of the lid and are stored between the outer circumference of the lid and the stepped portion provided along and near the opening rim of the cooking utensil on which the lid is mounted. Therefore, as the pressure inside the cooking utensil increases in the course of cooking, the lid is vibrated in the upper and the lower directions, namely, there is caused so-called dancing phenomenon and according to this phenomenon the water drops stored on the stepped portion are splashed outside the cooking utensil to thereby make dirty the neighbourhood of the cooking utensil.

The present invention is also intended to eliminate this drawback.

According to the present invention, the lid is curved to enable the water drops to flow from the inner central portion to the outer circumference of the lid, has the reinforcing ring member attached integral to the outer circumference and has the water drop guiding member downwardly projected from the inner and lower side of the reinforcing ring member, so that the water drops flowing from the inner central portion to the outer circumference of the lid are securely guided by the water drop guiding member into the cooking utensil before they reach the stepped portion of the cooking utensil without being stored between the outer circumference, to which the reinforcing ring member is attached, and the stepped portion provided along and near the opening rim of the cooking utensil. Accordingly, the lid according to the present invention prevents the neighbourhood of the cooking utensil from being made dirty by the splashing water drops even if the lid is vibrated in the upper and the lower directions depending on an increase in pressure in the cooking utensil.

These and other objects as well as merits of the present invention will be apparent from the detailed description with reference to the accompanying drawings.

Figure 1:
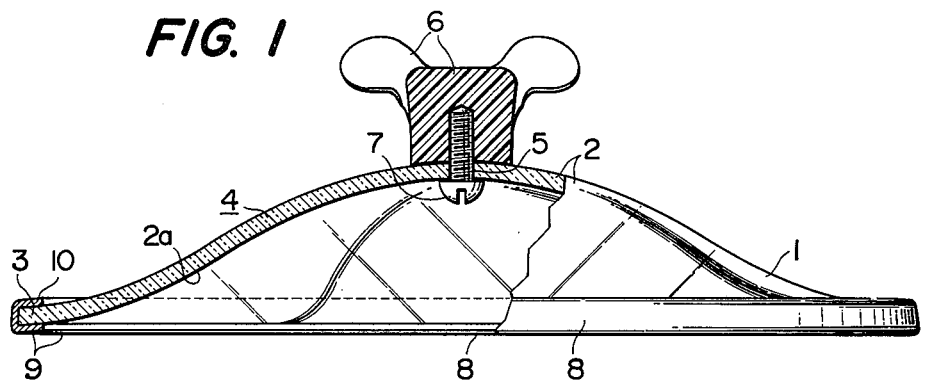
FIG. 1 is a plane view, partly broken away, showing an example of the cooking utensil lid of the present invention.

There will be now described an example of the cooking utensil lid shown in FIG. 1.

A sheet of transparent glass plate made of mainly soda lime glass is cut to have a desired shape and an area such as a circle, a square and an oval and to form a transparent glass plate 1 which is the body of a lid. This transparent glass plate 1 is heated in the range of about 600° C – 640° C. This heated glass plate 1 is curved using a pattern (not shown) such as a suction type pattern to form a lid 4 of desired shape having a see-through portion 2 swelled in the upper direction and an engaging rim portion 3 which is provided along the outer circumference of the swelled see-through portion 2 and which is to be engaged with the opening rim of a cooking utensil (not shown). The lid thus formed is rapidly cooled by the blast of cool air to render the whole of the lid 4 tempered. Then, the lid 4 is taken out of the pattern.

In the center of the see-through portion 2 of the lid 4 is provided a screw bore 5 through which a screw 7 is inserted from the underside of the lid 4 and screwed into a knob 6 which is placed on the screw bore 5. The knob 6 may be fixed on the lid 4 using a bonding agent.

Numeral 8 represents a reinforcing ring member made of, for example, rubber, synthetic resin or the like. The reinforcing ring member 8 has a section of fallen letter "U" and is adapted to cover the engaging rim portion 3 of the lid 4.

In case the reinforcing ring member 8 is made of metal it is formed to have a size to cover the engaging rim portion 3 of the lid 4 and to have a section of letter "L" with its outer circumference vertically bent.

The reinforcing ring member 8 made of rubber, synthetic resin or the like and formed to have a section of fallen letter "U" is fitted onto the engaging rim portion 3 of the lid 4 by the action of its elasticity, while the reinforcing ring member 8 made of metal and formed to have a section of letter "L" is attached to the engaging rim portion 3 of the lid 4 in such a manner that on the lower horizontal portion 9 of the reinforcing ring member 8 is placed the engaging rim portion 3 of the lid 4 and that the vertically standing outer circumference of the reinforcing ring member 8 is then bent onto the engaging rim portion 3 to have a section of fallen letter "U" and to hold the engaging rim portion 3 between the upper horizontal portion 10 and the horizontal portion 9 of the reinforcing ring member 8.

The lid 4 thus formed is mounted on the opening rim of a cooking utensil in such a manner that the engaging rim portion 3 of the lid 4 is engaged with the opening rim of the cooking utensil and allows the state of cooking in the cooking utensil to be checked through the see-through portion 2 of the lid 4 so that the best cooking can be done checking the state of cooking with the lid 4 mounted on the cooking utensil.

In the case of this example, the see-through portion 2 is swelled in the upper direction and therefore, vapor flows down on the inner slanted surface 2a to the outer circumference of the see-through portion 2 at the same time when vapor reaches the inner surface, thus preventing the see-through portion 2 from being blurred by vapor.

Figure 2:
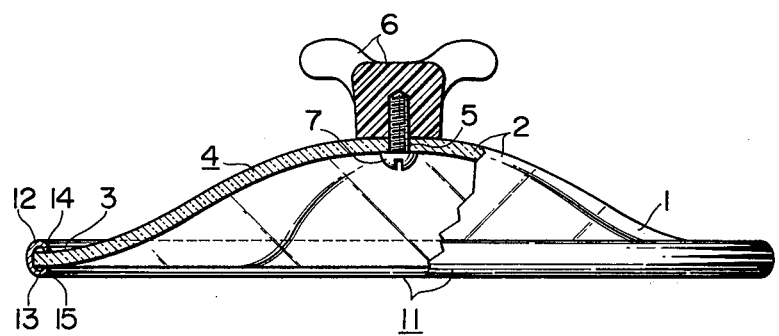
FIG. 2 is a plane view, partly broken away, showing other example of the cooking utensil of the present invention.
Figure 3:
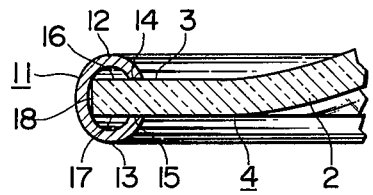
FIG. 3 is an enlarged section showing a portion of the example shown in FIG. 2.

There will be now described other example of the cooking utensil lid shown in FIGS. 2 and 3.

In this example, a reinforcing ring member 11 formed to have a section of letter "C" is attached to the engaging rim portion 3 of the lid 4 which has the see-through portion 2 shown in FIG. 1.

The reinforcing ring member 11 made of rubber, synthetic resin or the like is formed to have a size to cover the engaging rim portion 3 of the lid 4 and to have a section of letter "C" comprising an upper and a lower parts 12 and 13 opposing each other.

The reinforcing ring member 11 made of metal is formed to have a size to cover the engaging rim portion 3 of the lid 4 and to have a section comprising a vertically standing outer circumference part and a lower curved part 13.

The reinforcing ring member 11 made of rubber, synthetic resin or the like is fitted onto the engaging rim portion 3 of the lid 4 by the action of its elasticity in such a manner that both ends 14 and 15 of the upper and the lower curved parts 12 and 13 contact with the upper and the lower surfaces 16 and 17 of the engaging rim portion 3 to hold the rim portion therebetween.

On the other hand, the reinforcing ring member 11 made of metal is attached to the engaging rim portion 3 of the lid 4 in such a manner that the engaging rim portion 3 of the lid 4 is placed on the lower curved part 13 of the reinforcing ring member 11 and that the vertically standing outer circumference part of the reinforcing ring member 11 is then curved along the end face 18 of the engaging rim portion 3 onto the upper surface 16 of the engaging rim portion 3 tophold the engaging rim portion 3 at the upper and the lower surfaces 16 and 17 thereof between both ends 14 and 15 of the upper and the lower curved parts 12 and 13.

Accordingly, the reinforcing ring member 11 made of rubber, synthetic resin or metal covers the upper and the lower surfaces 16 and 17 as well as the end face 18 of the engaging rim portion 3 of the lid 4 and a buffer portion having a narrow air space is formed between the upper curved part 12 and the upper surface 16 and between the lower curved part 13 and the lower surface 17, respectively.

The lid 4 thus formed is detachably mounted on the opening rim of a cooking utensil. In this case the engaging rim portion 3 of the lid 4 elastically covered by the reinforcing ring member 11 is securely protected and left untouched with the cooking utensil or the like so that there is no anxiety that the engaging rim portion 3 is damaged or broken off at the time when it is mounted on or taken off from the cooking utensil or is stocked or washed out.

Figure 4:
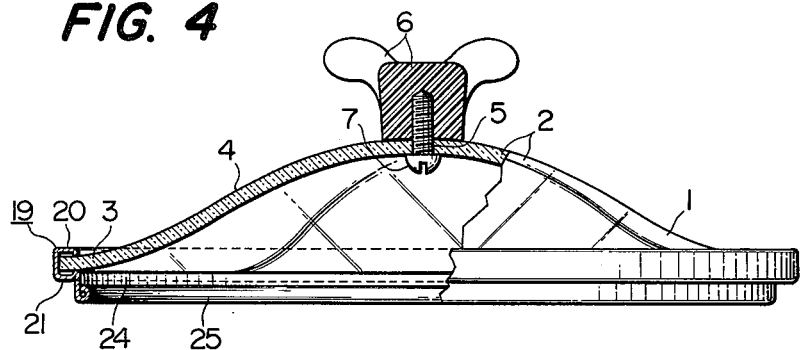
FIG. 4 is a plane view, partly broken away, showing another example of the cooking utensil lid of the present invention.
Figure 5:
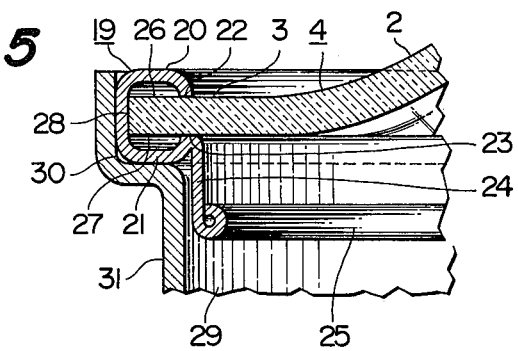
FIG. 5 is an enlarged section showing a portion of the example shown in FIG. 4.

There will be now described another example of the cooking utensil lid shown in FIGS. 4 and 5.

In this example, a reinforcing ring member 19 having a guiding member for guiding water drops is attached to the engaging rim portion 3 of the lid 4 which has the see-through portion 2 shown in FIG. 1.

Similar to those of the example shown in FIGS. 2 and 3, this reinforcing ring member 19 made of rubber, synthetic resin or the like is formed to have a section of letter "C" comprising an upper and a lower curved parts 20 and 21 opposing each other and to have the water drop guiding member 24 of ring shape downwardly projected from the end 23 of the lower curved part 21. The lowermost end of the water drop guiding member 24 is inwardly bent to form a ring-shaped bent portion 25.

On the other hand, similar to those of the example shown in FIGS. 2 and 3, the reinforcing ring member 19 made of metal is formed to have a section comprising a substantially vertically standing outer circumference part and a lower curved part 21, from the end 23 of which is downwardly projected the water drop guiding member 24. The lowermost end of the water drop guiding member 24 is also inwardly bent to form a ring-shaped bent portion 25. The reinforcing ring member 19 thus formed is attached to the engaging rim portion 3 of the lid 4 in the same way as shown in FIGS. 2 and 3.

The reinforcing ring member 19 made of rubber, synthetic resin or metal covers the upper and the lower surfaces 26 and 27 as well as the end 28 of the engaging rim portion 3 of the lid 4 while both ends 22 and 23 of the upper and the lower curved parts 20 and 21 contact with the upper and the lower surfaces 26 and 27 to hold the engaging rim portion 3 of the lid 4 therebetween. In this case, too, a buffer portion having a narrow air space is formed between the upper curved part 20 and the upper surface 26 and between the lower surface 27 and the lower curved part 21, respectively. The water drop guiding member 24 is located more inwardly by the width of the curved part 20 or 21 from the outer circumference of the reinforcing ring member 19.

The lid 4 formed as described above is used in such a manner that the reinforcing ring member 19 attached to the engaging rim portion 3 of the lid 4 is mounted on the stepped portion 30 provided along and near the opening rim of a cooking utensil 29. In this case, the water drop guiding member 24 of the reinforcing ring member 19 is located inside the side wall 31 of the cooking utensil 29 to have a slight space therefrom and to be left untouched therewith.

Since the see-through portion 2 of this lid 4 is also swelled in the upper direction, vapor generated in the course of cooking reaches the inner surface of the see-through portion 2 to immediately become water drops which flow on the inner surface to the lower portion 3 and which are then guided by the water drop guiding member 24 to fall inside the cooking utensil 29 without flowing to the stepped portion 30 of the cooking utensil 29, thus preventing the see-through portion 2 of the lid 4 from being blurred.

Figure 6:
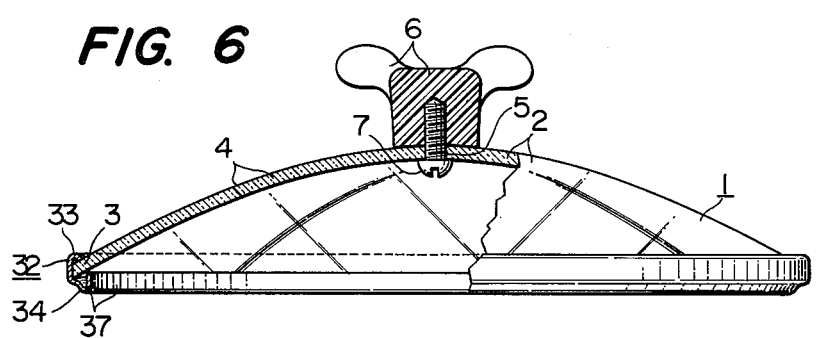
FIG. 6 is a plane view, partly broken away, showing a further example of the cooking utensil lid of the present invention.
Figure 7:
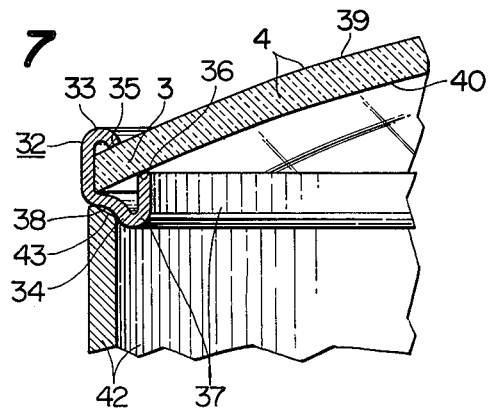
FIG. 7 is an enlarged section showing a portion of the example shown in FIG. 6.

There will be now described a further example of the cooking utensil lid shown in FIGS. 6 and 7.

The cooking utensil lid 4 of this example is formed in the same way as shown in FIG. 1 to have a spherical surface with about same curvature from the engaging rim portion 3 to the top of the see-through portion 2. Numeral 32 represents a reinforcing ring member made of same material as those employed to form the reinforcing ring members 8, 11 and 19 shown in FIGS. 1 through 5, said reinforcing ring member 32 being formed to have a size to cover the engaging rim portion 3 of the lid 4 and to have a section of letter "C". The lower part 34 of the reinforcing ring member 32 has a ring-shaped engaging projection 37 projected downwardly from the end 36 of the part 34 and a ring-shaped engaging recess 38 provided outside the projection 37. The engaging rim portion 3 of the lid 4 is placed on the end 36 of the lower curved part 34 and the vertically standing outer portion of the reinforcing ring member 32 is curved onto the upper surface of the engaging rim portion 3 in the same way as shown in the above-described examples, to thereby hold the engaging rim portion 3 at the upper and the lower surfaces 39 and 40 thereof between the end 35 of the upper curved part 33 and the end 36 of the lower curved part 34. As a result, the engaging rim portion 3 of the lid 4 is covered by the reinforcing ring member 32 as already described above.

When the cooking utensil lid 4 thus formed is placed on a cooking utensil 42 such as frying pan, the opening rim 43 of the cooking utensil 42 is fitted in the engaging recess 38 of the reinforcing ring member 32 attached to the lid 4. Therefore, this lid 4 can be easily mounted on or taken off from the cooking utensil such as the frying pan which has no stepped portion along and near the opening rim, and the handling of the lid 4 is also extremely easy.

What is claimed is:

1. A method of making a cooking utensil lid comprising the steps of heating a transparent glass plate cut to have a desired shape, forming the heated transparent glass plate to a lid body having an engaging rim portion provided around the outer circumference of a see-through portion of the lid body, cooling the whole of the lid body by the blast of cool air to a room temperature to render the whole of the lid tempered, and fitting a reinforcing metal ring member integrally onto and around the engaging rim portion to thereby surroundingly embrace said rim portion by covering the the upper and the lower surfaces as well as the end of the engaging rim portion and to form buffer air spaces between the upper surface of the engaging portion and the reinforcing metal ring member and between the lower surface of the engaging portion and the reinforcing metal ring member, respectively.

* * * * *